United States Patent [19]

Rütschle et al.

[11] Patent Number: 4,616,398

[45] Date of Patent: Oct. 14, 1986

[54] TOOLHOLDER FOR A MACHINE TOOL

[75] Inventors: Eugen Rütschle, Mühlheim; Rudolf Haninger; Hans-Henning Winkler, both of Tuttlingen, all of Fed. Rep. of Germany

[73] Assignee: Chirom-Werke GmbH, Fed. Rep. of Germany

[21] Appl. No.: 664,491

[22] Filed: Oct. 24, 1984

[30] Foreign Application Priority Data

Nov. 2, 1983 [DE] Fed. Rep. of Germany ....... 3339619

[51] Int. Cl.$^4$ ............................................ B23Q 3/157
[52] U.S. Cl. ...................................... 29/568; 29/26 A
[58] Field of Search .................. 29/568, 26 A; 408/35

[56] References Cited

U.S. PATENT DOCUMENTS 3,590,470 7/1971 Brainard ............................... 29/568
3,840,981 10/1974 Kielma et al. ....................... 29/568
4,309,809 1/1982 Yokoe et al. ......................... 29/568

Primary Examiner—Z. R. Bilinsky
Attorney, Agent, or Firm—Lowe, Price, Leblanc, Becker & Shur

[57] ABSTRACT

A toolholder is provided for a machine tool having a magazine containing several toolholders from which a selected toolholder can be taken by means of an arm and introduced in a working position in a rotating receiving means of the machine tool. An arm with a holding part that can be rotated via a pivot bearing in the direction of the shaft of the receiving means, is applied to the toolholder. In order to prevent the rotatably disposed toolholder from being carried along in its rotation during introduction into the spindle of the machine tool by the form-fitting coupling means of the spindle, without said coupling means engaging with the toolholder, braking means are provided which, during the introduction of the toolholder into the rotating receiving means, increase the frictional connection between the holding piece and the toolholder.

11 Claims, 4 Drawing Figures

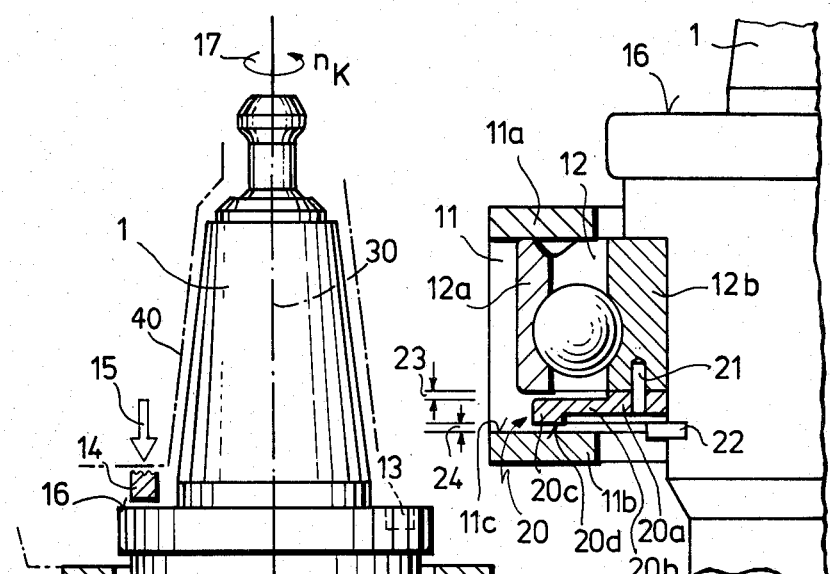
Fig. 2
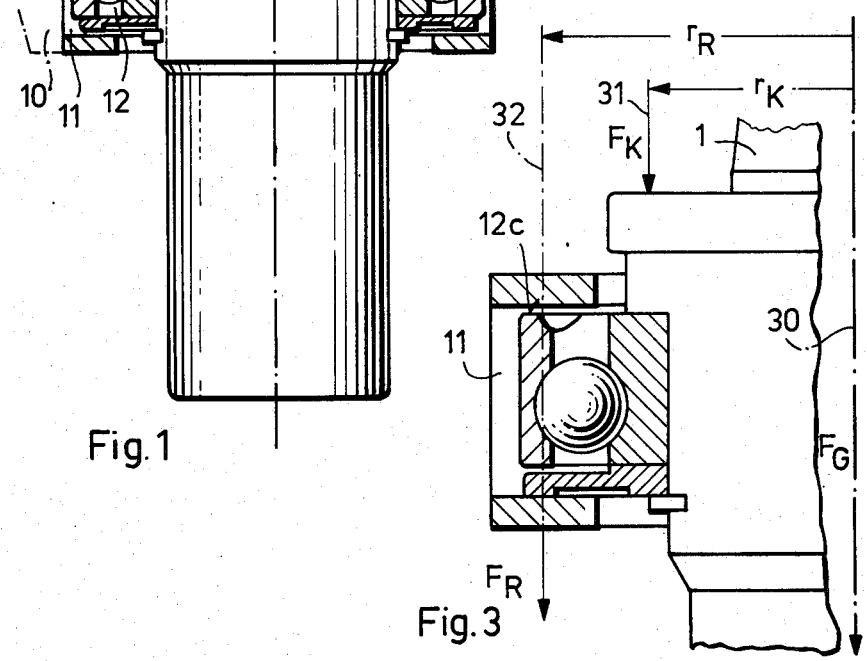
Fig. 1
Fig. 3

TOOLHOLDER FOR A MACHINE TOOL

FIELD OF THE INVENTION

This invention relates to a toolholder for a machine tool having a magazine containing several toolholders. More particularly the invention relates to a toolholder for a machine from which a selected toolholder can be removed by means of an arm and introduced into a working position in a rotating receiving means of the machine tool, wherein said arm, by means of a support or holding portion and using a pivot bearing, can be rotated in the direction of the shaft of the receiving means and applied to the toolholder, while preferably remaining at the toolholder and in the working position.

BACKGROUND

Toolholders of this type, especially those which control numerous machine tools, are known, for example, from the brochure "Computer Numerical Control" of Chiron-Werke GmbH, Applicant's assignee.

In known arrangements of this type, a toolholder with a clamped-in tool is, by means of an arm, removed from a magazine which is disposed either adjacent a spindle head or revolves around the said spindle head. In order to save tool changing time which is necessary in order to remove the arm after clamping-in of the toolholder, and to return it for a subsequent tool change, it is known to dispose the toolholder so that it can be rotated within the arm and so that the arm, during the working of the tool, can remain around the toolholder.

When clamping-in a new toolholder, the toolholder within the arm is introduced from below into the receiving means of the spindle head, while the receiving means of the spindle head rotates at a lower speed, the so-called coupling speed. This is to ensure that a sliding block located at the receiving means locates and engages the matching groove on the toolholder which, at this point, is disposed so as to be rotatable but is halted because corresponding applied forces are lacking.

When the toolholder is moved upward, the sliding block will usually strike the plane countersurface of the toolholder and will slide along on it until it has located and engaged the matching groove. The toolholder will then be pulled into the spindle and will be hydraulically locked there in place.

However, if the friction between the sliding block and the countersurface of the toolholder is too extensive, the sliding block will rest on the countersurface under friction and in this position, will carry the rotatable inside part of the toolholder along in its rotation so that locating and engaging of the sliding block into the groove is delayed or does not take place at all.

SUMMARY OF THE INVENTION

The present invention is based on the objective of developing a toolholder of the above-mentioned type wherein, when the toolholder is introduced into the receiving means of the spindle, any undesirable rotation of the toolholder is prevented and thus delay of the form-fitting engagement of the sliding block with the groove of the toolholder is avoided.

According to the present invention, this objective is achieved by the provision of braking means which, during the introduction of the toolholder into the rotating receiving means, is effective to increase the frictional contact between the support or holding part and the toolholder.

The toolholder according to the invention therefore has the significant advantage that, by braking or actually restraining the otherwise rotatable part of the toolholder, a fast and secure engagement of the sliding block in the groove is insured. When a brake is used, there is also the additional advantage that the sliding block cannot strike into the groove with a hard impact, and the extent of increased frictional tightness can always be adjusted in such a way that there is a soft interlock between the receiving means of the spindle and the toolholder. On the whole, this results in the advantage that the time saved during the tool change because the arm remains at the toolholder, is fully utilized and overall processing time of a workpiece can be decreased and manual interventions in the case of disturbances of the above-mentioned type can be avoided.

Especially preferred is an embodiment where the pivot bearing, in a known manner, is a ball bearing, roller bearing or similar device. In the case of use of a ball bearing or similar device, there is also the possibility that parts that can be rotated with respect to one another and clearly separated from one another in regard to space, namely an inner raceway and a cage, are provided so that, on the one hand, the means required for holding the toolholder, and on the other hand, the means provided for braking, can be applied at the toolholder in different ways, for example, in radial or an axial direction.

An embodiment is also preferred where the braking means has a brake disk that is coaxial with respect to the axis of the toolholder, said brake disk, in a first circumferential area, being connected in a rotatably stable manner with the toolholder or the holding part, and rests against the holding part or the toolholder under friction when the toolholder is introduced into another circumferential area.

This feature has the advantage that it provides an especially compact construction because a brake disk of this type requires only very little additional space. Therefore, the overall outer dimensions of the toolholder according to the invention, as compared to a conventional toolholder are not substantially increased. The arrangement is also very simple in its construction so that little or very minimal additional manufacturing costs are required.

The above-mentioned characteristics also provide the advantage that the brake disk can be arranged below the pivot bearing, so that the support or holding part lifts the toolholder up into the working position and during lifting, the holding part, via the brake disk, rests against the toolholder.

These measures have the other important advantage that no special braking forces have to be generated but the inherent weight of the toolholder and the clamping force exercised by the arm, can be utilized because the toolholder is lifted into working position by the fact that the effective braking surfaces are first disposed on top of one another under the force of the weight of the toolholder, and the clamping force is added after the impact on the sliding block.

According to another development of the invention, the desired braking effect can be improved by the fact that the working surface between the brake disk and the toolholder is preferably provided on both sides with a friction lining or its equivalent such as a roughened surface.

Finally, an embodiment is preferred where the support or holding part is provided with an upper plate and a lower plate, the clearing distance or spacing from one to the other being greater than the distance between the top side of the outer part of the pivot bearing and the bottom side of the brake disk. These features have the advantage that, while an extremely simple construction of the toolholder according to the invention is maintained, when the toolholder is lifted, the elements located in the bottom part, namely the brake disk and the effective braking area, become operative, whereas after the introduction of the toolholder into the receiving means of the spindle and the positioning of the toolholder into these receiving means, the effective braking surfaces are separated from one another and the tool, so that upon termination of the working cycle, they can be unclamped again without problem by lowering of the arm because of the contact in the upper area of the holding part.

The toolholder according to the invention therefore makes it possible to carry out the above-described improvements and advantages using only very few additional elements.

The invention therefore provides a toolholder for a machine tool having a magazine containing multiple toolholders from which a selected toolholder can be taken by means of an arm and introduced into a working position in a rotating receiving means of the machine tool by an arm or a pivot bearing in a holding part, wherein the arm can be rotated in a direction of the shaft of the receiving means, and applied to the toolholder, the improvement including braking means, which during the introduction of the toolholder into the rotating means, increase the frictional connection between the holding part and the toolholder.

Other advantages can be found in the description and attached drawing.

The characteristics that will be described and claimed in the following description are considered to be essential to the invention alone or in the indicated combination. It is also clear that various mechanisms may be provided without departing from the scope of this invention.

BRIEF DESCRIPTION OF THE DRAWINGS

Reference is now made to the drawings accompanying the application wherein:

FIG. 1 is a diagrammatic general view of a toolholder according to the invention;

FIG. 2 is a partial representation of FIG. 1 at an enlarged scale in the working position of the toolholder;

FIG. 3 is a representation similar to the one in FIG. 2, but in the introduction position of the toolholder.

DESCRIPTION OF PREFERRED EMBODIMENTS

Figure 4:
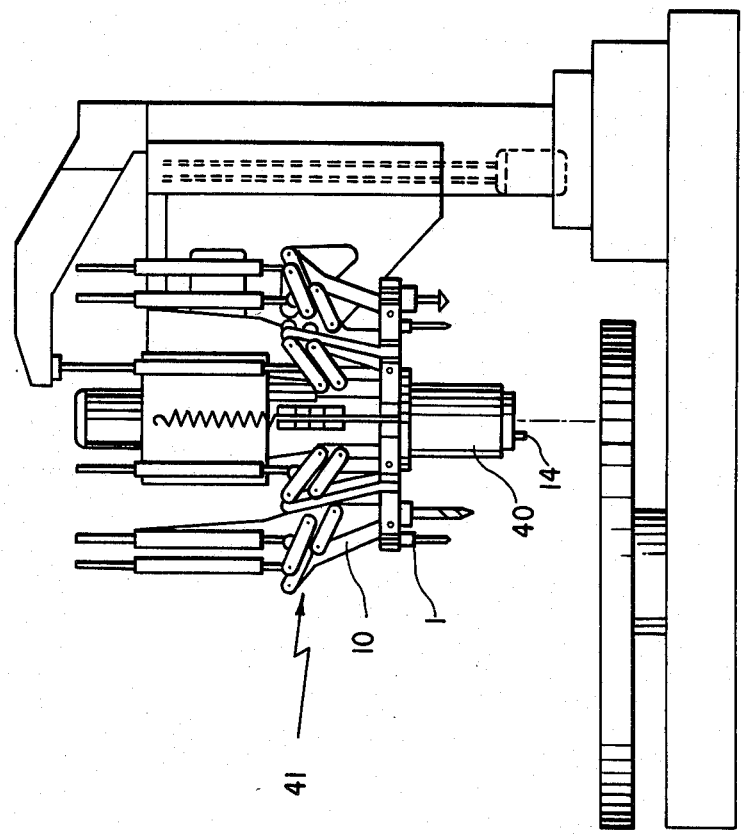
FIG. 4 is a diagrammatic general view of a machine tool and a magazine containing plural toolholders arranged adjacent thereto.

Referring now specifically to the drawings accompanying the Application, it will be seen that in FIGS. 1 and 4, a toolholder has the reference number 1, as it is used for machine tools, especially the type that control numerous machine tools. The toolholder 1, with a clamped-in tool that is not shown in the figure, is disposed in a magazine 41 next to a plurality of other toolholders of the same type into which other tools are clamped. This magazine 41 may, for example, be arranged next to a spindle 40 or around a spindle. Each toolholder 1 is continuously held by an arm 10 which moves the toolholder 1 out of the magazine position and into the working position. In the embodiment according to FIG. 1, the working position is reached by reason of the fact that the toolholder 1, by means of the arm 10, is swivelled so as to approach from the side and in an upward direction and introduced into a spindle 40 of the machine tool, also not shown in FIG. 1.

For this purpose, the arm 10 ends in a support or holding part 11 which holds the toolholder in the manner described in detail below, so that the arm 10 with the support or holding part 11 can also remain on the toolholder during the operation of said toolholder. The support or holding part 11 is affixed to the toolholder via a ball bearing arrangement 12.

When the toolholder 1 is introduced into the spindle of the machine tool from below, a groove 13 in surface 16 of the toolholder 1, which points toward the spindle, approaches an assigned sliding block 14 of the receiving means of the spindle. As the toolholder approaches the spindle, the toolholder is not in a defined position with respect to the spindle, because of the pivot bearing of the toolholder. Therefore, the sliding block 14 must first "search for" or detect the pertinent or receiving groove 13. For this purpose, the spindle turns at a so-called coupling speed $n_K$, as indicated by reference number 17 in FIG. 1.

When the toolholder 1 is stationary, the sliding block 14 will slide along the surface 16 in circumferential direction until it engages the assigned groove 13 so that the drive of the machine tool will have a defined rotational starting position with respect to the toolholder 1 and thus to the clamped-in tool.

If there is a sufficient friction between the sliding block 14 and the surface 16, the sliding block 14 may position itself on the surface 16, and not properly in the groove 13. In this position it may take along in its rotation the toolholder 1 so that the sliding block 14 will only engage in the groove 13 late or not at all.

In order to prevent this problem, the present invention provides a braking device which will be described in detail with reference to FIGS. 2 and 3.

Referring to FIGS. 2 and 3, it will be seen that support or holding part 11 consists of an upper plate 11a and a lower plate 11b, the inside surface of which is assigned reference number 11c. In the case of the ball bearing arrangement 12, the outer cage has the reference number 12a and the inner raceway has the reference number 12b. The top portion or side of the cage 12a has the reference number 12c.

At the bottom of the ball bearing arrangement 12, a brake disk 20 is disposed which has an inside portion 20a, a medium portion 20b, and an outside portion 20c, and a bottom side of the outside part which has the number 20d. As shown in FIG. 2, the brake disk 20, in the area of the inside part 20a, by means of a first pin 21, is connected in a rotatably stable manner with the inner raceway 12b of the ball bearing arrangement 12. The brake disk 20 therefore will rotate since it is firmly connected with the toolholder 1. FIG. 3 shows that the ball bearing 12 and the brake disk 20, by means of a second pin 22, are jointly affixed to the top at the toolholder 1.

A first space or distance 23 is provided between the bottom side of the cage 12a and the top side of the outside portion 20c. This space or distance 23 may be very short and need only insure that the cage 12a can rotate freely with respect to the brake disk 20. A defined second space or distance 24 is provided between the bottom side 20d of the outside portion 20c of the brake disk 20, and the inside surface 11c of the lower plate 11b of the support or holding part 11. In the case of this embodiment, this second distance 24 is preferably 0.5 mm long. As shown in FIG. 2, the upper plate 11a of the support or holding part 11 rests on the cage 12a of the ball bearing arrangement 12 so that the overall clearing distance of the plates 11a and 11b from one another is as much larger as the second distance 24, than the distance between the inside surface 12c of the cage 12a and the bottom side 20d of the brake disk 20.

FIG. 2 shows the position of the toolholder when it is located in the working position of the spindle. The upper plate 11a of the support or holding part 11 supports itself on the cage 12a of the ball bearing arrangement 12, while the lower plate 11b is disposed at a distance from the ball bearing 12 and the brake disk 20. Thus, using the ball bearing arrangement 12, the toolholder 1 can operate and rotate freely. When the toolholder 1 is to be removed, it is released in the spindle of the machine tool, and the support or holding part 11, by means of the upper plate 11a, presses on the cage 12a and thus presses the toolholder 1 out of the spindle toward the bottom.

The method of operation of the toolholder according to the invention corresponds generally to that of the above mentioned known toolholders. However, the brake disk 20 becomes effective when the toolholder 1 is inserted into the spindle of the machine tool from the bottom, as described below with reference to FIG. 3.

As explained above, the inside clearing distance or spacing of the plates 11a, 11b from one another is longer than the joint width of the ball bearing 12 and the brake disk 20. In the case of an opposing motion, a "dead space" is therefore created between the support or holding part 11 and the toolholder 1. When the toolholder 1 is led to the spindle from below, the brake disk 20 with the outside portion 20c, rests on the inside surface 11c of the lower plate 11b of the support or holding part 11. This loose or slack contact of the brake disk 20 with the holding part 11 causes an increased frictional connection between the toolholder 1 and the arm 10.

When the force of the weight of the toolholder 1 is referred to as $F_G$, the force of the placed sliding block 14 at a distance $r_k$ from the axis of rotation 30 of the toolholder 1, is referred to as $F_k$, and the contact force or frictional force of the brake disk 20 on the lower plate 11b at a radius $r_r$ from the axis 30 is referred to as $F_R$, the following relationship will be true:

$F_R = R_k \cdot F_G$ $M_K = F_k \cdot r_k$ $M_R = R_R \cdot r_r$

In an embodiment, the coupling moment $M_k$ is, for example, 20.8 Ncm, and the braking moment $M_R$ is, for example 48 Ncm. This means that the braking moment is much larger than the coupling moment and therefore insures that the sliding block 14 no longer carries along the toolholder 1 in its rotation but rather slides securely along the surface 16 until it engages in the groove 13. In this case, it is an advantage that the radius $r_r$ is larger than the radius $r_k$.

As soon as this occurs, the toolholder 1, by means of a corresponding known receiving means on the spindle, is pulled upward so that the brake disk 20 lifts off the lower plate 11b, and the position shown in FIG. 2 is obtained whereby the frictional connection between the arm 10 and the toolholder 1(with the exception of that of the ball bearing) is again zero.

Obviously, the brake means shown as an example in FIGS. 1 to 3 may also be designed differently. It is possible, for example, to pin the brake disk in a rotatably fixed manner to the support or holding part 11 instead of to the inner raceway 12b, and during introduction, let it reach frictional contact with the inner raceway 12b. Other braking means acting in a radial direction may also be provided, such as a radially movable pin which, during the insertion of the toolholder 1, slides at the circumferential surface of the toolholder 1 or of the inner raceway 12b. It is also clear that for the defined adjustment of the braking moment, the bottom side 20d and/or the inside surface 11c may be provided with a friction lining or may have a roughened surface.

This distance or spacing between the top portion or side 12c and the bottom side of the upper plate 11a (see FIG. 3) may also be equal to or larger than the second distance 24. Thus, in one case (compare FIG. 2), when the toolholder 1 is pulled into the spindle in the working position, the cage 12a rests against the upper plate 11a. In another case (not shown in the figure), the cage 12a with the brake disk 20 in the working position of the toolholder 1 is disposed freely between the plates 11a, 11b, and when the toolholder 1 is unclamped, the arm 10 moves down and the upper plate 11a returns to contact with the cage 12a.

The invention has been described with reference to certain preferred embodiments. However, as variations thereon will become apparent to those skilled in the art, the invention is not to be considered as limited thereto.

What is claimed is:

1. In a tool change apparatus for a machine tool having a magazine containing multiple toolholders from which a selected toolholder can be taken by means of an arm and introduced into a working position in a rotating receiving means of the machine tool by said arm having a rotatable holding part enabling the arm to remain in the working position continuously holding said toolholder during operation thereof, the improvement including braking means for, during the introduction of the toolholder into the rotating means, increasing the frictional connection between the holding part and the toolholder in cooperation with the holding part.

2. A tool change apparatus according to claim 1, wherein the holding part is a ball bearing.

3. A tool change apparatus according to claim 1, wherein said braking means includes a brake disk disposed coaxially with respect to the axis of the toolholder, said brake disk, in a first circumferential area, being connected to one of the toolholder and the holding part in a rotatably stable manner, and wherein, during the introduction of the toolholder, rests against one of the holding part and the toolholder under friction in a second circumferential area.

4. A tool change apparatus according to claim 3, wherein the holding part is a pivot bearing and the brake disk is arranged in a position below the pivot bearing, wherein the holding part moves the toolholder into the working position, during which time, the brake disk is applied to the toolholder via the holding part.

5. A tool change apparatus according to claim 4, wherein the areas of contact between the brake disk and the toolholder are provided on both sides with a friction lining surface.

6. A tool change apparatus according to claim 4, wherein the holding part is provided with an upper plate and a lower plate, the spacing from one to the other being larger than the distance between the top side of an outside cage of the pivot bearing and the bottom side of the brake disk.

7. A toolholder assembly for a machine tool, said toolholder assembly comprising a magazine containing multiple toolholders, arm means by which a selected toolholder can be removed and introduced into a working position in a rotating receiving means of the machine tool, a holding part disposed on a pivot bearing for rotation in the direction of the shaft of the receiving means, said holding part being adapted to continuously hold the toolholder in the working position during operation, and braking means cooperating with the pivot bearing to increase the frictional connection between the holding part and the toolholder during introduction of the toolholder into the rotating receiving means.

8. A toolholder assembly according to claim 7, wherein the pivot bearing is a ball bearing and the like.

9. A toolholder assembly according to claim 7, wherein said braking means includes a brake disk coaxial with respect to the axis of the toolholder, said brake disk, in a first circumferential area, being connected with one of the toolholder and the holding part in a rotatably stable manner, and rests against one of the holding part and the toolholder under friction in a second circumferential area during introduction of the toolholder.

10. A toolholder assembly according to claim 9, wherein the brake disk is arranged below the pivot bearing, so that the holding part moves the toolholder into the working position, at which time the holding part is applied to the toolholder by the brake disk.

11. A toolholder according to claim 10, wherein the areas of contact between the brake disk and the toolholder is provided on both sides with a roughened surface.

* * * * *